(12) United States Patent
Hoose

(10) Patent No.: US 7,751,461 B2
(45) Date of Patent: Jul. 6, 2010

(54) LINEWIDTH-NARROWED EXCIMER LASER CAVITY

(75) Inventor: John Hoose, Fairport, NY (US)

(73) Assignee: Newport Corporation, Irvine, CA (US)

( * ) Notice: Subject to any disclaimer, the term of this patent is extended or adjusted under 35 U.S.C. 154(b) by 161 days.

(21) Appl. No.: 12/184,712

(22) Filed: Aug. 1, 2008

(65) Prior Publication Data
US 2010/0027579 A1    Feb. 4, 2010

(51) Int. Cl.
*H01S 3/22* (2006.01)
(52) U.S. Cl. .......................... 372/57; 372/64
(58) Field of Classification Search .......... 372/55, 372/54, 57
See application file for complete search history.

(56) References Cited

U.S. PATENT DOCUMENTS

| | | | |
|---|---|---|---|
| 5,404,366 A | 4/1995 | Wakabayashi et al. | |
| 5,625,499 A | 4/1997 | Chen | |
| 5,652,681 A | 7/1997 | Chen et al. | |
| 5,970,082 A | 10/1999 | Ershov | |
| 6,678,291 B2 * | 1/2004 | Vogler et al. | 372/32 |
| 6,762,880 B2 | 7/2004 | Holm et al. | |
| 6,834,069 B1 * | 12/2004 | Bergmann et al. | 372/57 |
| 6,868,106 B1 | 3/2005 | Vogler | |
| 6,958,859 B2 | 10/2005 | Hoose et al. | |
| 7,075,963 B2 * | 7/2006 | Basting et al. | 372/55 |

OTHER PUBLICATIONS

Shoshan et al. "The Use of A Diffraction Grating as a Beam Expander in a Dye Laser Cavity" Optics Communications, Jun. 1978, vol. 25, No. 3, pp. 375-378.

* cited by examiner

*Primary Examiner*—Minsun Harvey
*Assistant Examiner*—Tuan N Nguyen
(74) *Attorney, Agent, or Firm*—Rissman Hendricks & Oliverio, LLP

(57) ABSTRACT

An excimer laser cavity is disclosed which includes at least one grating-prism (grism) and a wavelength-selective diffraction grating arranged in sequence. The grism grating surface faces the gain medium and produces an expanded beam which is diffracted on the same side of the prism grating surface normal as the incident beam. The expanded diffracted beam is transmitted through a second surface of the grism either to another grating surface of an additional grism or to a wavelength-selective diffraction grating operating in Littrow configuration. The laser produces a laser output beam with a narrow spectral linewidth which is suitable, in particular, for lithography applications.

7 Claims, 3 Drawing Sheets

LINEWIDTH-NARROWED EXCIMER LASER CAVITY

BACKGROUND

Lasers are used, for example, for material processing and in semiconductor manufacturing, where the small feature size of today's circuit elements and interconnects demands very fine structural feature definition on the scale of tens of nanometers. Lasers are also employed in the production of optical gratings, such as volume gratings, holographic gratings, as well as in the distributed feedback (DFB) and distributed Bragg reflection (DBR) sections in diode lasers and optical fibers. The dimensions of the achievable structural features are related to the laser wavelength and to laser linewidth. Modern semiconductor fabs increasingly use wavelengths in the deep ultraviolet (DUV) and soft x-ray lithography for mask exposure. In addition, the definition of these small features also requires novel mask designs, such as phase masks, and the narrowest attainable laser linewidth, because a spectral distribution of the illuminating source would tend to wash out the desired features.

Suitable light sources operating in the UV and deep UV are excimer lasers, such as ArF, KrF excimer lasers, which have an emission wavelength of less than 250 nm and a FWHM (full width at half maximum) of about 300 pm.

In one conventional approach, an excimer laser cavity may be formed by an output coupler in form of a partially reflecting mirror and an echelle grating, reducing the linewidth of a KrF laser from 300 pm to about 0.8 pm. However, some applications, for example, submicron lithography (<250 nm) for integrated circuit fabrication requires a linewidth of about 0.5 pm or less. Alternatively, a double-pass configuration with a single echelle grating may be used for reducing the linewidth, whereby the laser radiation propagating in the cavity is incident on the grating twice with different polarization directions. However, this particular arrangement is not practical for generating the high laser output power required for high-throughput mask exposure due to the relatively low diffraction efficiency of conventional echelle gratings. The diffraction efficiency is typically about 60% per pass; therefore, the double pass loss from the gratings alone would be 0.6×0.6=36% which would result in a laser output power too low for applications in semiconductor manufacturing.

In another prior art approach for reducing the bandwidth, etalons are placed inside the laser cavity to filter out unwanted wavelength regions of the emission spectrum. However, etalons are susceptive to optical damage which makes them unsuitable for high power laser applications.

FIG. 4 illustrates yet another conventional approach similar to the laser cavity design disclosed in FIG. 6b of U.S. Pat. No. 6,795,473B1, the contents of which are incorporated by reference herein. The laser cavity 40 uses a traditional grism (prism-grating) 64 for wavelength dispersion and a separate prism pair 42 for beam expansion. The grism 64 transmits the principal order of the dispersion spectrum of the grating substantially in the direction of the incident beam, while outer portions of the spectral distribution of the incident beam are dispersed away from the beam path of the principal order. In this way, the grism 64 spectrally narrows the incident beam.

The prior art laser system 40 of FIG. 4 includes in addition to the grism 64 and the double-prism beam expander 42 a laser chamber 2, an partially reflecting output coupler 44 for an exiting output beam 41, and a reflective mirror 70. The grism 64 is essentially a prism with a grating surface 66 disposed on or formed on a major surface of the prism. The expanded beam from laser chamber 2 incident on the grating surface 66 of grism 64 and propagates collinearly with the incident beam through the rear prism surface 68 to mirror 70 where the beam is retroreflected back into the laser chamber 43 through the grism 64. The rear prism surface 68 may be AR coated at the lasing wavelength. The laser chamber 2 may be an excimer laser gain section, such as ArF or KrF. The output coupler 44 may have about 10% reflectivity at the lasing wavelength, although other reflectivity values may be selected. Not illustrated are apertures, beam scrambler, etalons or other prisms which may be required for optimal operation, but can be conventional and are not part of the invention.

While these prior art systems have proven somewhat useful in the past, a number of shortcomings have been identified. For example, the use of beam expanding prisms increases the number of optical surfaces in the laser cavity 40 which increases system complexity and cost. Further, prisms with a high beam expansion necessitate a large angle of incidence of the incident beam on the prism surface. Moreover, the light intensity transmitted across an air/dielectric interface at large angles of incidence disadvantageously depends strongly on the polarization direction of the light beam.

The development of integrated circuits with an ever increasing component density and decreasing feature size requires high power illumination sources operating at shorter wavelengths and having a narrow emission linewidth, while retaining high efficiency. Accordingly, there is an ongoing need for high-efficiency optical modules that are able to further narrow the optical linewidth of excimer lasers without sacrificing output power and electrical-to-optical conversion efficiency.

SUMMARY

The present application is directed to a laser cavity employing one or more transmission grisms for narrowing the linewidth of the laser output beam, without requiring a separate prism beam expander.

In one embodiment, a line-narrowed excimer laser system is disclosed which includes a laser cavity with a gain medium, an output coupler and a reflector assembly, wherein the reflector assembly includes at least one grating-prism (grism) and a wavelength-selective diffraction grating arranged in sequence. The at least one grism has a grating disposed on a first prism surface. The grating faces the gain medium and receives laser light from the gain medium at a first angle of incidence with respect to a normal of the first prism surface. The angle of incidence is selected so as to produce an expanded beam which is diffracted on the same side of the first prism surface normal as the incident beam and to transmit the expanded diffracted beam through a second surface of the grism to the wavelength-selective diffraction grating.

The wavelength-selective diffraction grating operates in Littrow configuration and diffracts the received expanded diffracted beam back through the grism or grisms into the laser cavity, thereby narrowing the linewidth of the laser emission wavelength relative to the wavelength distribution of the laser light produced in the gain medium.

Alternate embodiments of the laser system may include one or more of the following features. The grating disposed on the first prism surface may operate in $2^{nd}$ order for high-efficiency diffraction. The expanded diffracted beam may exit the grism substantially normal to the second surface which may subtend an angle of about 10° with the second surface. The second surface may be AR coated at the laser emission wavelength. The angle of incidence may be between 60° and 90° with respect to the grating normal. The prisms may be made of a material which is substantially transparent to the laser emission wavelength, i.e. wavelengths in the deep UV and/or UV spectral range.

Further features and advantages of the present invention will be apparent from the following description of preferred embodiments and from the claims.

BRIEF DESCRIPTION OF THE DRAWINGS

The above and further advantages of the embodiments of the line-narrowed excimer laser may be better understood by referring to the following description in conjunction with the accompanying drawings in which.

DETAILED DESCRIPTION

Figure 1:
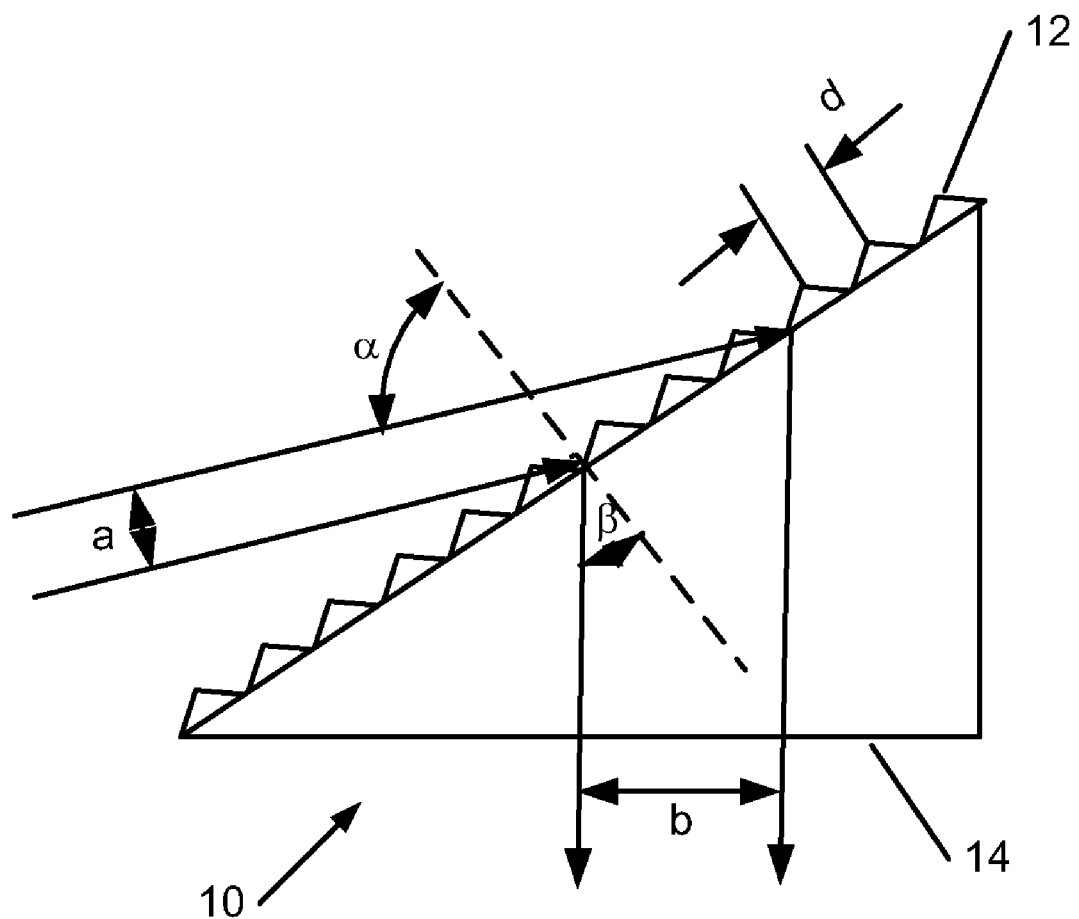
FIG. 1 illustrates schematically the beam expansion of an incident beam attained with a grism.
Figure 4:
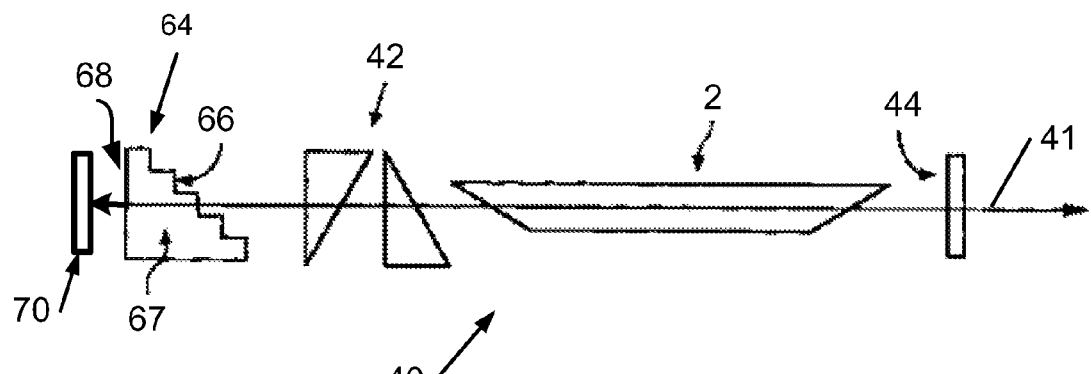
FIG. 4 illustrates in schematic form a prior art design of an excimer laser cavity with a prism beam expander and a grism reflector.

Wavelength-tunable lasers typically employ external gratings as tuning elements. In one, more traditional configuration, the grating is blazed at a high angle, typically greater than about 79°, and operates in an autocollimating (Littrow) mount. To obtain high wavelength discrimination, the incident beam should fill the entire grating, requiring either a telescopic lens arrangement or prism beam-expanding optics.

If in addition to wavelength selection, spectral narrowing of the laser output wavelength is also desired, the grating can be operated in Littrow configuration at a large diffraction angle. The wavelength dispersion affecting the spectral width of the output beam can be expressed as:

$$\frac{\partial \Theta}{\partial \lambda} = \frac{1}{\cos \Theta} * \frac{m}{d} \quad \text{(Eq. 1)}$$

wherein $\Theta$ is the angle between the grating normal and the incident beam, m is the diffraction order and d is the grating period. As suggested by Eq. (1), the dispersion $$\frac{\partial \Theta}{\partial \lambda}$$

can be increased by operating the grating at a high diffraction order m and/or by having a small grating period d and/or by operating at almost grazing incidence ($\Theta \approx 90°$), however at the expense of diminished efficiency.

The equivalent halfwidth $\Delta\lambda$ of the spectral distribution can be derived from Eq. (1) as:

$$\frac{\Delta\lambda}{\lambda} = \frac{\lambda}{\pi \cdot l \cdot \sin \Theta} \quad \text{(Eq. 2)}$$

wherein l is the length of the illuminated part of the grating and the angle $\Theta$ has the same definition as above.

As seen from Eq. (2) a larger illuminated area of the grating produces a beam with a narrower linewidth. It is therefore customary to expand the beam incident on the grating with a beam-expanding reflection grating, as disclosed, for example, by Shoshan and Oppenheim (Optics Communications, Vol. 25, No. 3, p. 375-378 (1978)), or with one or more prisms, as disclosed, for example, by Kleinschmidt et al. (U.S. Pat. No. 6,795,473), the contents of which are hereby incorporated by reference herein. The prisms providing the magnification operate at a large angle of incidence and are generally anti-reflection coated on both the entrance and exit surface, with light passing through the prisms and exiting the prisms through the anti-reflection coated exit surface generally at normal incidence. The reflectivity and transmissivity of the incident prism surface depends on the polarization of the incident wave. At the large angle of incidence on the prism face required to attain sufficient beam expansion of approximately 3, which is required in currently available systems, these prisms operate most efficiently in TM polarization. This forces an echelle or a Littrow grating performing the wavelength selection to operate also in TM polarization. However, echelle gratings employed in excimer lasers have in general much higher diffraction efficiency for TE polarization than for TM polarization. Because prisms have a much lower dispersion than gratings, their contribution to the wavelength selectivity is negligible, so that the dispersion for wavelength selectivity of the output beam resides predominantly with the echelle grating.

FIG. 1 shows a prism 10 with a transmission grating 12 formed on one surface. In the illustrated embodiment the transmission grating 12 is formed on the hypotenuse of the prisms 10, although those skilled in the art will appreciate that at least one transmission grating 12 may be formed on any surface of the prisms 10. The grating 12 can be designed to efficiently diffract also TE-polarized incident beams even at the high angle of incidence required for efficient beam expansion. The wavelength dispersion of the combined transmission grating prism 10, hereinafter also referred to as, can be described by the equation:

$$\frac{\partial \Theta}{\partial \lambda} = \frac{1}{\cos \Theta} * \frac{m}{nd} \quad \text{(eq. 3)}$$

wherein n is the index of refraction of the prism material. The term "grism" derives from the combination of the terms grating and prism.

FIG. 1 also shows the anamorphic beam expansion or magnification attained with the grism:

$$M = |b|/|a| = \cos \beta / \cos \alpha \quad \text{(eq. 4)}$$

wherein a is a beam diameter (or another characteristic beam dimension) of the incident beam, b is the beam diameter (or a corresponding beam dimension) inside the prism, $\alpha$ is the angle of incidence with respect to the grating surface normal, and $\beta$ is in the angle of diffraction in the prism with respect to the grating surface normal. The beam in the present example is assumed to exit normal to the prism face 14. The diameter of the exit beam may decrease slightly if it exits face 14 at an angle different from normal incidence.

Figure 2:
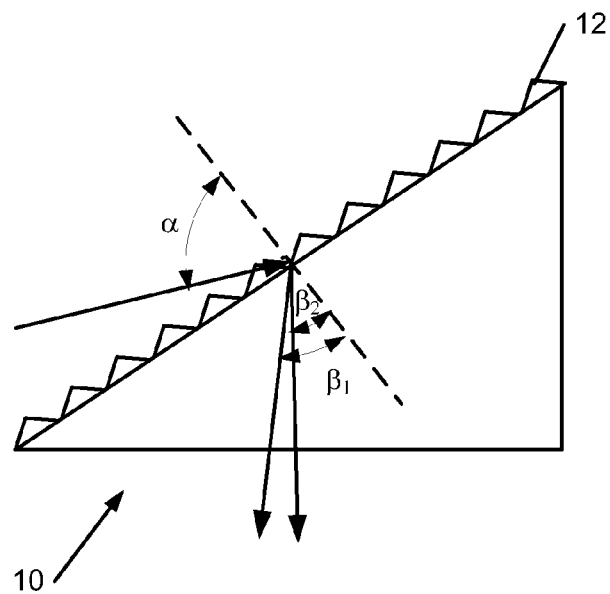
FIG. 2 illustrates schematically the propagation of an incident and diffracted/refracted beam in a grism for different wavelengths.

For n=1.5 (glass), $\lambda$=0.193 µm, d=0.382 µm and d=2,618 g/mm, Eq. 1 has solutions for both positive and negative $2^{nd}$ order diffraction by grating 12 for angles of incidence $\alpha$ of less than 30°. For angles of incidence a greater than 30°, a solution exists only for the positive diffraction order, wherein the diffracted beam is located at the same side of the grating normal as the incident beam. This situation is illustrated in FIGS. 1 and 2. With the aforementioned parameters, the magnification M is about 2 for an angle of incidence $\alpha=60°$ and about M=3.6 for an angle of incidence $\alpha=74°$.

FIG. 2 illustrates schematically the wavelength dispersion in the exemplary grism 10. In the wavelength range around 0.193 μm of interest for excimer lasers, the dispersion, as indicated by the angles $\beta_1$ and $\beta_2$, is about 5 nm/degree, virtually independent of the angle of incidence a between 60° and 74°.

Figure 3:
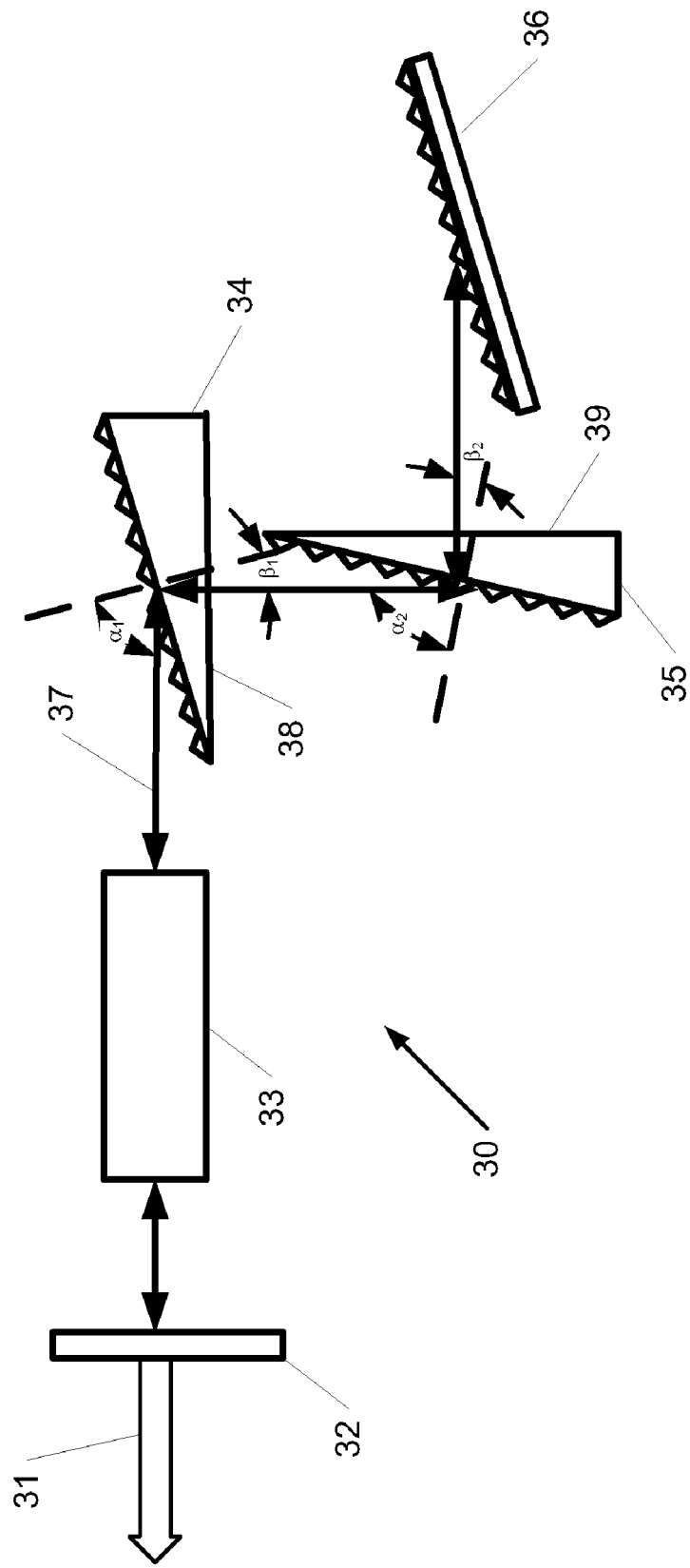
FIG. 3 illustrates schematically an exemplary embodiment of a laser cavity according to the present invention with two grisms.

FIG. 3 shows a linewidth-narrowed laser system 30 according to one embodiment of the invention. In one embodiment, the laser system 30 includes an excimer laser with a laser chamber 33, an output coupler 32 for an output beam 31, a grating 36 for wavelength tuning operating in Littrow configuration, and a double-grism beam expander 34, 35. Optionally, any variety of laser systems 30 configured to include one or more grisms therein may be used. Exemplary alternate laser systems include, without limitation, gas lasers, alkali halide lasers, solid state lasers, fiber lasers, semiconductor lasers, and the like. Referring again to FIG. 3, the laser beam 37 propagating inside the laser cavity is incident on grism 34 at an angle of, for example, $\alpha_1=70°$ and diffracted at an angle of, for example, $\beta_1=10°$ toward the grism exit face 38, which may be AR coated. As described above, the beam exiting at exit face 38 is magnified by magnification factor $M_1$, which depends on the angle of incidence $\alpha_1$, the angle of diffraction $\beta_1$, and the refractive index of the prism. The beam exiting preferably normal to exit face 38 is then incident on a second grism 35, which can have a design similar to that of grism 34. The angle of incidence and diffraction, respectively, of the second grism 35 are denoted as $\alpha_2$ and $\beta_2$. The beam incident on grism 35 is diffracted as before and also exits essentially normal to exit face 39, providing additional magnification $M_2$, which may be identical to $M_1$. The twice diffracted beam is then incident on Littrow grating 46 which wavelength-selectively diffracts almost the entire incident intensity back toward grisms 35 and 34. After passing through grisms 35 and 34, the laser light reenters the gain region of laser chamber 33. Grating 36 may be a conventional Littrow grating with a large blaze angle, but other recently developed grating with high efficiency at excimer laser wavelengths, such as a grating of the type disclosed in U.S. Pat. No. 6,958,859, the contents of which are incorporated herein in their entirety by reference, may be employed. The grating may be operated, for example, in $3^{rd}$ order with a diffraction efficiency approaching 95% at a design wavelength of 193 nm. The optical power diffracted into the $0^{th}$, $1^{st}$ and $2^{nd}$ order is essentially zero.

The wavelength dispersions of the sequentially arranged grisms 34, 35 illustrated in FIG. 3 are additive. This will increase the wavelength selectivity over that of a configuration with a single grism and further narrow the linewidth.

The linewidth of the laser operating with one or more grisms is narrowed for two reasons: (1) The laser beam propagating in the cavity has an inherent beam divergence; and (2) the wavelength of the beam has a certain linewidth $\Delta\lambda$ depending on the laser cavity gain profile, which is diffracted by the grism(s) at different angles, as described above with reference to FIG. 2.

Those skilled in the art will appreciate that other embodiments with only one grism or more than two grisms are possible. The grating surface may be ruled in the prism or deposited on the prism. The prism may be made of materials other than glass and capable of transmitting excimer laser wavelengths, for example, of $CaF_2$, which has a refractive index of about 1.4 in the wavelength range of interest.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A line-narrowed excimer laser system comprising:
   a laser cavity comprising a gain medium, an output coupler and a reflector assembly,
   the reflector assembly comprising at least two sequentially arranged grating-prisms (grisms), each grism having an input surface and an output surface, and a wavelength-selective diffraction grating arranged in sequence, with a first of the at least two grisms having a first grating disposed on the input surface of the first grism and facing the gain medium, with the first grating operating in $2^{nd}$ order and receiving laser light from the gain medium at a first angle of incidence with respect to a first grating normal, wherein the first angle of incidence is selected so as to produce a first diffracted expanded beam which is diffracted on the same side as the incident beam in relation to the first grating normal, with the first expanded diffracted beam exiting the output surface of the first grism and impinging on a second grating disposed on the input surface of the second of the at least two grisms at a second angle of incidence with respect to a second grating normal, wherein the second angle of incidence is selected so as to produce a second expanded diffracted beam which is diffracted on the same side as the first expanded diffracted beam in relation to the second grating normal, with the second expanded diffracted beam transmitted through the output surface of the second grism to the wavelength-selective diffraction grating,
   wherein the wavelength-selective diffraction grating operates in Littrow configuration and diffracts the received expanded diffracted beam back through the at least two grisms into the laser cavity, thereby narrowing the linewidth of the laser emission wavelength relative to the wavelength distribution of the laser light produced in the gain medium.

2. The laser system of claim 1, wherein the expanded diffracted beam exits the grism substantially normal to the output surface.

3. The laser system of claim 1, wherein at least the first angle of incidence is greater than 60° and less than 90° with respect to the first grating normal.

4. The laser system of claim 1, wherein the grism is made of a material substantially transparent to a laser emission wavelength propagating in the gain medium.

5. The laser system of claim 1, wherein the grism is made of a material substantially transparent to deep UV (DUV) or UV radiation, or both.

6. The laser system of claim 1, wherein the input surface and the output surface of each of the at least two grisms subtend an angle of about 10°.

7. The laser system of claim 1, wherein the output surfaces of the at least two grisms are AR coated at a laser emission wavelength propagating in the gain medium.

* * * * *